Aug. 25, 1942.    C. E. FREDERICKSON    2,293,731
HYDRAULIC CLUTCH TRANSMISSION MECHANISM
Filed July 9, 1941    3 Sheets-Sheet 1

Inventor
Clayton E. Frederickson
By Albert E. Dieterich
Attorney

Aug. 25, 1942.   C. E. FREDERICKSON   2,293,731
HYDRAULIC CLUTCH TRANSMISSION MECHANISM
Filed July 9, 1941   3 Sheets-Sheet 2

Inventor
Clayton E. Frederickson
By Albert E. Dieterich
Attorney

Aug. 25, 1942.  C. E. FREDERICKSON  2,293,731
HYDRAULIC CLUTCH TRANSMISSION MECHANISM
Filed July 9, 1941  3 Sheets-Sheet 3
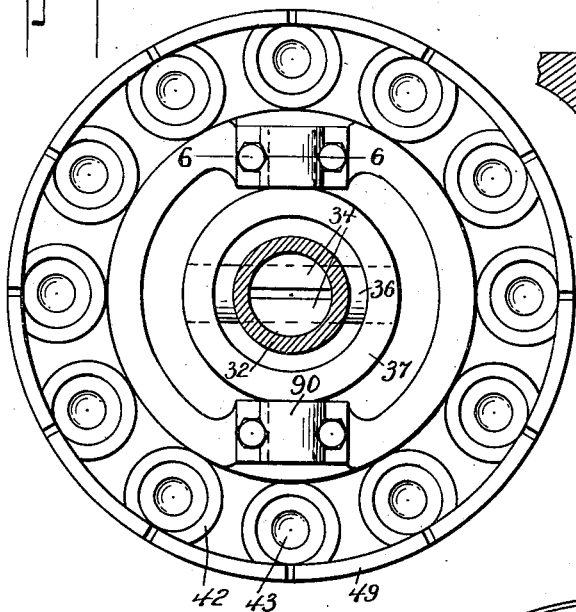
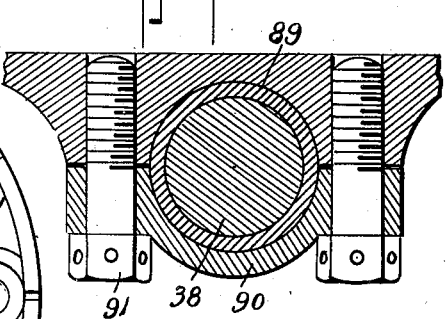
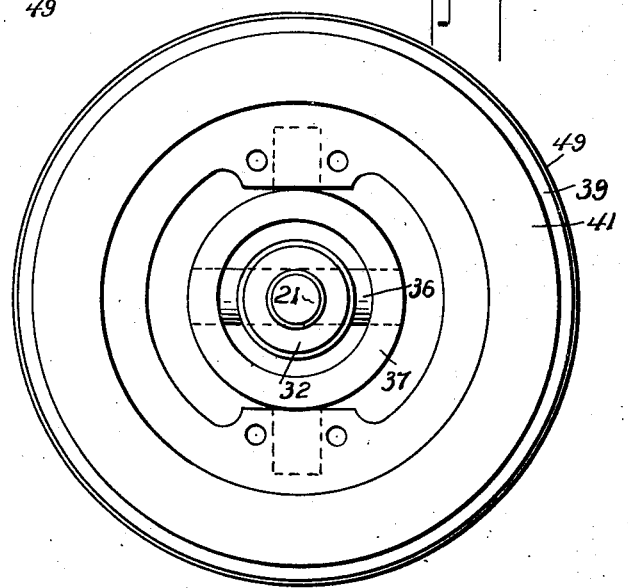
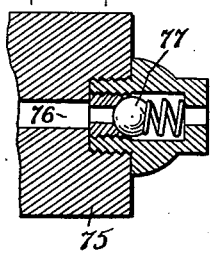
Inventor
Clayton E. Frederickson
By Albert E. Dieterich
Attorney Patented Aug. 25, 1942

2,293,731

UNITED STATES PATENT OFFICE 2,293,731

HYDRAULIC CLUTCH TRANSMISSION MECHANISM

Clayton Erasmus Frederickson, Chicago, Ill.

Application July 9, 1941, Serial No. 401,685

16 Claims. (Cl. 192—59)

My invention, which relates to speed changing transmissions, has especial reference to those transmissions which employ an incompressible fluid connection between driving and driven elements.

Generically, the invention has for its objects: to provide a hydraulic transmission mechanism which can be used in automobiles, brakes on airplanes, industrial clutches and in steering of tanks or crawler-type tractors; to provide a transmission mechanism of the class stated in which the hydraulic fluid travels in as short a path as possible and which allows great pressures to be produced; to provide means to relieve excessive pressures within the transmission case; to provide a hydraulic transmission employing an outer rotor (which also serves as the case) and an inner rotor, the two being operatively connected by a relatively large number of cylinders and pistons, a wabbler device and the hydraulic fluid, the pistons and their cylinders being in such number and being so cooperatively arranged that there is no dead center to pass over; to provide means in the cylinder heads for relieving resistance to the return movements of the pistons should the main oil ports be closed too far to admit oil into the cylinders fast enough on the suction strokes of the pistons; to provide an improved construction of the wabbler for ease of assembly, wear resistance and freedom of action; and, in general, to improve the construction so as to provide an efficient piece of apparatus that will, at the same time, be relatively inexpensive to build and will require few if any repairs or replacements over a long period of time.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 4 is a detail section on the line 4—4 of Fig. 1.

Fig. 5 is a detail elevation of the wabbler and the hub end of the inner rotor to which the wabbler is connected, looking from left to right in Fig. 1.

Fig. 6 is an enlarged detail section on the line 6—6 of Fig. 4.

Fig. 7 is an enlarged detail view of a portion of the valve stem and the relief valve thereon.

Fig. 8 is an enlarged view, partly in elevation and partly in section, of one of the piston rods.

Fig. 9 is an enlarged longitudinal section of one of the wabbler socket plugs.

Fig. 10 is a cross section on the line 10—10 of Fig. 9.

Figure 1:
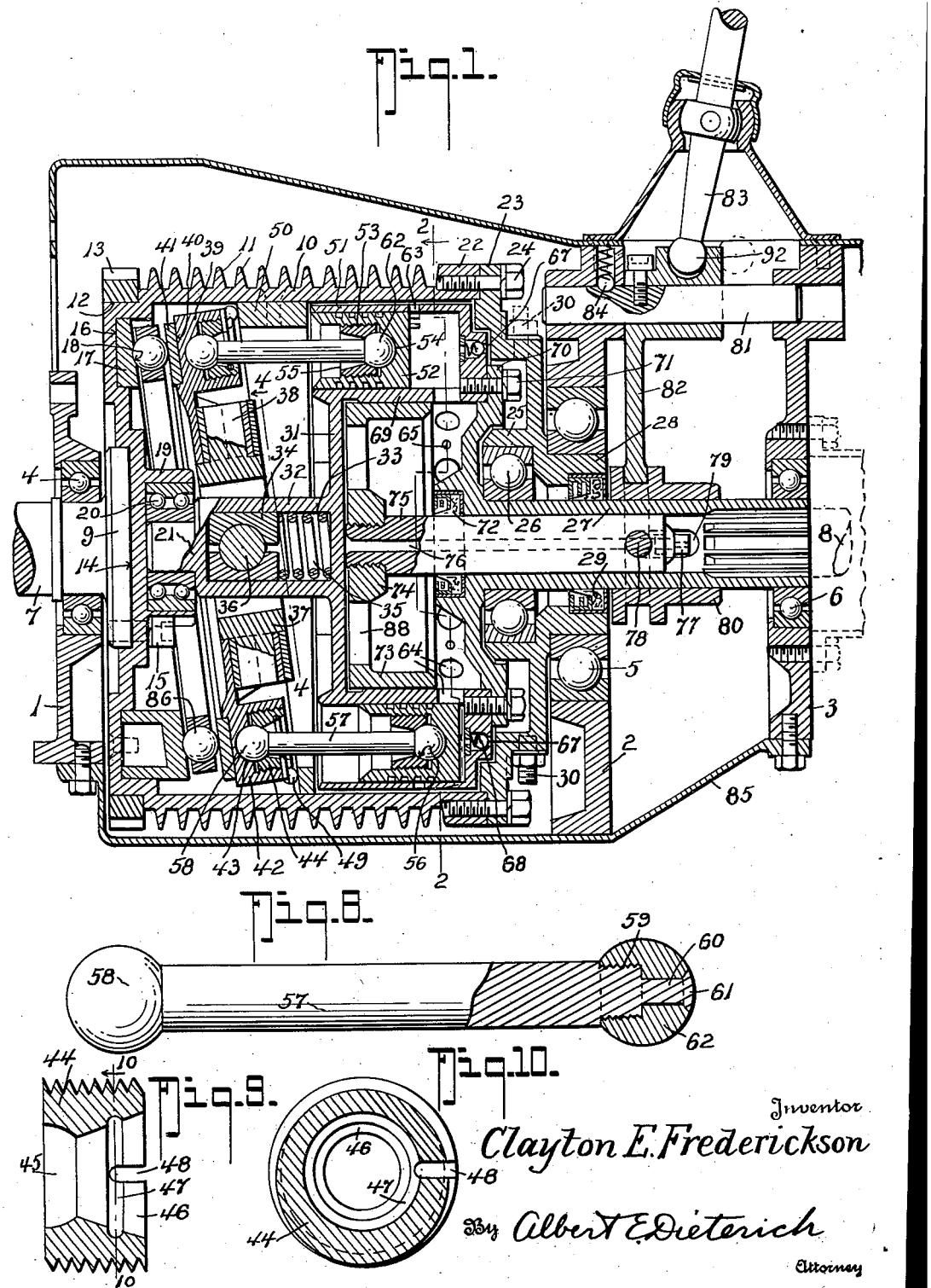
Fig. 1 is a central vertical longitudinal section of my mechanism.

In the drawings, in which like numbers of reference indicate like parts in all the figures, 1, 2 and 3 represent fixed supports for ball bearings 4, 5 and 6 respectively.

The drive shaft 7 (engine shaft, when the invention is used in motor vehicles) is journalled in bearing 4, and it has a flange 9 to which the case 10 of the outer rotor of the transmission is secured by screws 15.

A driven shaft 8 fits into the driven sleeve 27 of the inner rotor.

The outer rotor comprises a case 10 having cooling fins 11, a recess 14 for the flange 9, a seat 12 for a starter gear 13, and a recess 16 for a steel inclined track 17, an inclined guide ring 50 and a removable cover 23 secured to a flange 22 of the case 10 by cap screws 24 and having an inner hub 25 for a ball bearing 26 and an outer hub 28 for the ball bearing 5. The hub 28 is recessed to receive an oil-seal packing 29 of any suitable kind. It also includes a hollow hub 19 for a ball bearing 20.

Suitably located filler plugs or fittings 30 are provided for filling the rotor with oil.

The inner rotor 31 has a hub 32 slotted at 33 to receive bearing blocks 34 for the short shaft or pin 36 of a universal joint, and a pressure relieving spring 35. The hub 32 has a reduced end 21 to fit into the bearing 20 which is located in the hollow hub 19 of the outer rotor.

The inner rotor proper 31 includes a set (twelve preferably) of pump cylinders 51 arranged parallel to the common axis of the rotors and at equal distances radially therefrom. A piston 52 is located in each cylinder and is tapped at 53 to receive a screw plug 55. The piston head and the plug 55 have seats 54 and 56 respectively for the ball head 62 of a connecting rod 57.

Each connecting rod 57 also has a second ball head 58 to cooperate with a wabble ring 39.

In order to permit assembly of rod 57 and plug 53, one of the ball heads is made separately from the rod, say the head 62. As shown in Fig. 8, the rod has a reduced threaded portion 59 and a further reduced rivet-like end 60. The ball 62 is similarly bored and tapped so that when assembled the end 60 can be upset or riveted over as at 61 and thus rigidly secure ball 62 and rod 57 together.

The wabble ring 39 has a seat 40 to which is suitably secured a steel ball race-way ring 41 to cooperate with track-ring 17 and the interposed ball thrust bearing 86.

The track ring 17 preferably has a ball race-way or groove 18 to keep the balls centered about the axis of the ring.

The ring 37 of the universal joint has diametrically oppositely disposed stub shafts 38 to be received in bearing portions 89 of the wabble ring 39 and the bearing caps 90 bolted at 91 thereto (see Fig. 6).

The wabble ring carries a set of cups 42 (one for each connecting rod) having spherical segment bearing portions 43 and internally threaded recesses for the reception of screw plugs 44. The plugs 44 are (like the plugs 53) placed on the rods 57 before the heads 62 are secured in place.

Figure 11:
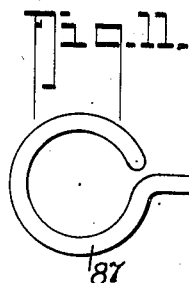
Fig. 11 is an elevation of one of the resilient split latch rings.

Each plug 44 has a spherical segment bearing 45 and a flared opening 46. It also has a latching ring groove 47 and slot 48 for a split spring-key 87 (see Fig. 11). If desired, the plugs 55 may be similarly equipped.

The wabble ring may also be provided with an annular bead 49 to contact the incline-ring 50. The inclined faces of track-ring 17 and incline-ring 50 parallel one another, as shown in Fig. 1.

Each cylinder 51 has piston controlled inlet ports 63. Each cylinder also has outlet ports 64 controlled by a shiftable piston type valve 73.

Figure 2:
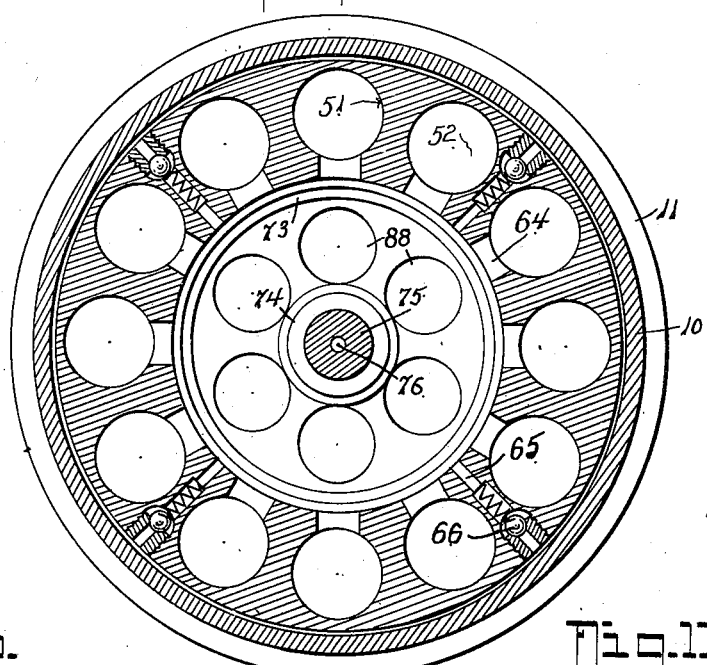
Fig. 2 is a cross section on the line 2—2 of Fig. 1, looking in the direction of the arrow.
Figure 3:
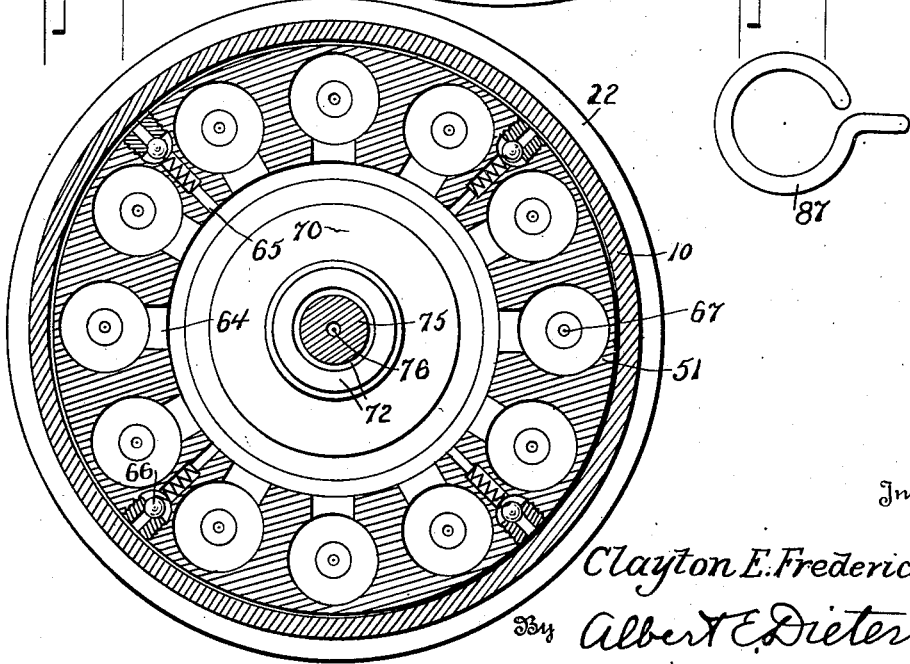
Fig. 3 is a similar section looking in the direction opposite the arrow on the line 2—2 of Fig. 1.

The inner rotor also has a single control valve cylinder 69 with which the ports 64 and several small ducts 65 communicate. The ducts 65 pass from the control valve chamber to the periphery of the rotor and are provided with one-way relief valves 66 (see Fig. 2).

The cylinder heads are each provided with ports 67 containing one-way valves 68 opening inwardly.

The inner rotor includes a cover 70 for the control valve chamber, the cover 70 being secured in place by means of cap screws 71. The cover 70 has a recess in which is located a suitable oil-seal packing 72 to prevent oil leakage between the sleeve 27 and the valve stem 75.

The valve stem 75 has a threaded reduced end to which the threaded hub 74 of the piston-valve 73 is secured (see Fig. 1). The stem 75 has a pressure relief duct 76 through the same to atmosphere, the outlet end of which is controlled by a one-way check valve device 77 of any approved construction (see Figs. 1 and 7). The web of the piston-valve 73 has oil passes 88.

A cross pin 78 is carried by the stem 75 and rides in a slot 79 in the sleeve 27. This pin connects with a sliding collar 80 on the sleeve. The pin 78 is bored to register with and form a part of duct 76, as shown in dotted lines in Fig. 1. The collar is operated by a shifting fork 82, carried by a sliding rod 81 mounted in suitable bearings in the fixed supports 2 and 3. A shifting lever 83 is connected with the fork 82 by a ball and socket joint 92 and a ball latch 84 holds rod 81 in either of its extreme positions.

A suitable shield or housing 85 may be provided to enclose the transmission mechanism if desired.

Operation

The case 10 being filled with a suitable grade of oil and the lever 83 being positioned as shown in Fig. 1, ports 64 will be wide open and offer but minimum resistance to the flow of oil from the cylinders 51 into the chambers of the cylinder 69, and vice versa.

As shaft 7 rotates and carries with it the outer rotor, the wabbler will cause successive pump pistons 52 to be forced inwards while the others are moved outward in succession. As the ports 64 are wide open the oil forced out by the inwardly moving pistons will pass through the chamber of valve cylinder 69 into the pump cylinders 51 of the receding pistons 52 without opposing substantial resistance. Hence, no motion will be imparted to the driven shaft 8.

By moving the lever 83 forwardly the piston-valve 73 may be made to close the ports 64 in part or in whole, as desired. When closed in part the resistnce to oil flow through ports 64 is proportionately increased and the inner rotor will therefore turn at speeds proportional to the degree of closure of ports 64, and, consequently driven shaft 8 will turn at the same speed as that of the inner rotor. With lever 83 all the way forward, ports 64 will be closed and oil cannot escape from the pump cylinders. Consequently the inner and outer rotors will be hydraulically locked together and will consequently turn at the same speed. Therefore shafts 7 and 8 will likewise turn at the same speed. This is the direct or high speed drive.

By providing the relief valves 68 in the cylinder heads, should at any time oil not flow into the cylinders 51 on the suction or outward strokes of the pistons 52, back pressure resistance against the outward movement of the pistons is eliminated as oil can flow into the pump cylinders through the valved ports 67. Should the oil pressure in the inner rotor fall below that in the outer rotor, oil will flow through the valved ports 65 and/or the ports 63 into the inner rotor until the pressure in the inner rotor is brought up to the desired amount. Should a predetermined excess pressure build up in the inner rotor it will be relieved by release of oil through valve stem duct 76.

By the use of my invention the necessity of a separate flywheel is avoided. By the use of ball bearings between the wabbler and the inclined pressure ring 17 friction is reduced to a minimum.

In my design of apparatus shown there are always five or more pump pistons being forced inwardly at a time and as the pumps are set on the outside diameter of the inner rotor there is no dead center and the pressure exerted on the wabbler plate is always the same, never greater, nor varied at any part of the travel or stroke of the pistons—the wabbler pumps acting as, or similar to, a C-clamp. The strain is always between ball bearings 86 and 26.

The provision of the spring loaded bearing 34 relieves pressure on pin 36, so all weight is carried on ball bearings; yet spring 35 is strong enough to keep all stretch out of the piston hook-up.

From the foregoing description, taken in connection with the accompanying drawings, it is thought the construction, operation and advantages of my invention will be clear to those skilled in the art. Modifications of details of structure, etc., can readily be made by those skilled in the art without departing from the scope of the appended claims.

What I claim is:

1. In a hydraulic transmission mechanism, an outer rotor and an inner rotor, a driving shaft coupled to said outer rotor, a driven element coupled to said inner rotor, a hydraulic fluid within said rotors, variable operative connections, including said fluid, between said rotors, by virtue of which said inner rotor is driven from said outer rotor at variable speeds, and means for admitting fluid from the outer rotor into the inner rotor, and means for releasing to atmosphere fluid from the inner rotor upon the building up of excessive pressure in the inner rotor.

2. In a hydraulic transmission mechanism, an outer rotor and an inner rotor, a driving shaft coupled to said outer rotor, a driven element coupled to said inner rotor, a hydraulic fluid within said rotors, variable operative connections, including said fluid, between said rotors, by virtue of which said inner rotor is driven from said outer rotor at variable speeds, and means for maintaining predetermined fluid pressure within said rotors, said means including valved ports for admitting fluid from the outer rotor into the inner rotor when the pressure in the inner rotor falls below that in the outer rotor, and means for releasing the pressures in the inner rotor upon the building up of excessive pressure in the inner rotor.

3. In a hydraulic transmission mechanism, an outer rotor and an inner rotor, a driving shaft coupled to said outer rotor, a driven element coupled to said inner rotor, a hydraulic fluid within said rotors, variable operative connections, including said fluid, between said rotors, by virtue of which said inner rotor is driven from said outer rotor at variable speeds, means including valved ports for admitting fluid from the outer rotor into the inner rotor, and a valved duct for releasing fluid from the rotors to atmosphere upon the building up of excessive pressure in the inner rotor.

4. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, and a ball bearing located between said inclined ring and said wabbler.

5. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, and a floating ball bearing located between said inclined ring and said wabbler.

6. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, and a ball bearing located between said inclined ring and said wabbler, and means to relieve thrusts on the universal joint where it is connected to said inner rotor.

7. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, a ball bearing located between said inclined ring and said wabbler, and means to relieve thrusts on the universal joint where it is connected to said inner rotor, said thrust-relieving means comprising a spring loaded bearing, for the connecting pin of the universal joint, slidably mounted on the inner rotor.

8. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, a ball race ring carried by said wabbler and a ball bearing located between said rings.

9. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, a hardened ball race ring carried by said wabbler, and a floating ball bearing located between said rings.

10. In a hydraulic transmission mechanism, an outer rotor and an inner rotor, a driving shaft coupled to said outer rotor, a driven element coupled to said inner rotor, a hydraulic fluid within said rotors, said inner rotor including a plurality of pump cylinders and pistons and a control valve cylinder, pump pistons in said pump cylinders, and a valve in the control valve cylinder, ports between said control valve cylinder and said pump cylinders, controlled by said valve, a wabbler mounted on said inner rotor by means of a universal joint, an inclined ring carried by said outer rotor, a ball race ring carried by said wabbler and a ball bearing located between said rings, said inclined ring including a grooved track for the balls of said ball bearing.

11. In a hydraulic transmission mechanism, an outer rotor comprising a cylinder closed at one end by an integral wall, a removable head for the other end of the cylinder, a driving shaft secured axially to said rotor, an inclined track member mounted in said cylinder adjacent its walled end, an inner rotor comprising a body having a plurality of pump cylinders arranged about a common axis of said rotors, and having a valve cylinder, said valve cylinder being open at one end, a removable cap for said open end, said cap having a sleeve projecting through an opening in the wall of the head of said outer rotor, an oil seal between said sleeve and said outer rotor head, ball bearings between said outer and inner rotors by virtue of which said inner rotor is rotatably mounted in said outer rotor, oil ports between said valve cylinder and said pump cylinders, a valve in said valve cylinder and having a stem mounted in and projecting through said sleeve, means to shift said valve to close or open said ports, pump pistons in said piston cylinders, a wabbler universally mounted on said inner rotor, connecting rods between said wabbler and said pump pistons, a ball bearing between said inclined track member and said wabbler, and a hydraulic fluid in said rotors.

12. In a hydraulic transmission mechanism, an outer rotor comprising a cylinder closed at one end by an integral wall, a removable head for the other end of the cylinder, a driving shaft secured axially to said rotor, an inclined track member mounted in said cylinder adjacent its walled end, an inner rotor comprising a body having a plurality of pump cylinders arranged about a common axis of said rotors, and having a valve cylinder, said valve cylinder being open at one end, a removable cap for said open end, said cap having a sleeve projecting through an opening in the wall of the head of said outer rotor, an oil seal between said sleeve and said outer rotor head, ball bearings between said outer and inner rotors by virtue of which said inner rotor is rotatably mounted in said outer rotor, oil ports between said valve cylinder and said pump cylinders, a valve in said valve cylinder and having a stem mounted in and projecting through said sleeve, means to shift said valve to close or open said ports, pump pistons in said piston cylinders, a wabbler universally mounted on said inner rotor, connecting rods between said wabbler and said pump pistons, a ball bearing between said inclined track member and said wabbler, a hydraulic fluid in said rotors, and means for maintaining a predetermined pressure within the inner rotor.

13. In a hydraulic transmission mechanism, an outer rotor comprising a cylinder closed at one end by an integral wall, a removable head for the other end of the cylinder, a driving shaft secured axially to said rotor, an inclined track member mounted in said cylinder adjacent its walled end, an inner rotor comprising a body having a plurality of pump cylinders arranged about a common axis of said rotors, and having a valve cylinder, said valve cylinder being open at one end, a removable cap for said open end, said cap having a sleeve projecting through an opening in the wall of the head of said outer rotor, an oil seal between said sleeve and said outer rotor head, ball bearings between said outer and inner rotors by virtue of which said inner rotor is rotatably mounted in said outer rotor, oil ports between said valve cylinder and said pump cylinders, a valve in said valve cylinder and having a stem mounted in and projecting through said sleeve, means to shift said valve to close or open said ports, pump pistons in said piston cylinders, a wabbler universally mounted on said inner rotor, connecting rods between said wabbler and said pump pistons, a ball bearing between said inclined track member and said wabbler, a hydraulic fluid in said rotors, and means including ports between said pump and valve cylinders and the outer rotor, and means for relieving excessive pressure in the inner cylinder and back check valves in said ports.

14. In a hydraulic transmission, inner and outer rotors, an inclined track, a wabbler and pumps having pistons, and piston-rods connecting the pump pistons with the wabbler, said pump pistons and said wabbler having sockets with spherical segment seats, removable bearing plugs for said sockets having rod passages and complementary spherical segment seats, said piston rods each comprising a rod having an integral ball head at one end, and a separable ball head at the other end, said plugs having latch-spring receiving grooves and latch springs held in said grooves and engaging parts of the sockets to hold the plugs against screwing and unscrewing.

15. In a hydraulic transmission mechanism, an outer rotor and an inner rotor, a shaft connected to the outer rotor and another shaft connected to the inner rotor, a hydraulic fluid within said rotors, variable operative connections between said rotors, said connections including said fluid and also including pump cylinders carried by one of said rotors and having pistons, a wobbler connected with said pistons, a universal joint means for mounting said wobbler on the rotor which carries the pump cylinders, and an inclined ring carried by the other rotor for cooperation with said wobbler.

16. In a hydraulic transmission mechanism, an outer rotor and an inner rotor, a shaft connected to the outer rotor and another shaft connected to the inner rotor, a hydraulic fluid within said rotors, variable operative connections between said rotors, said connections including said fluid and also including pump cylinders carried by one of said rotors and having pistons, a wobbler connected with said pistons, a universal joint means for mounting said wobbler on the rotor which carries the pump cylinders, an inclined ring carried by the other rotor for cooperation with said wobbler, and an anti-friction bearing located between said ring and said wobbler.

CLAYTON ERASMUS FREDERICKSON.